(No Model.)

J. STRAYER.
FERTILIZER DISTRIBUTER.

No. 262,498. Patented Aug. 8, 1882.

WITNESSES
W. Engel
Jno. Crowell Jr

INVENTOR
Jacob Strayer
By Leggett & Leggett
ATTORNEYS

N. PETERS. Photo-Lithographer, Washington, D. C.

UNITED STATES PATENT OFFICE.

JACOB STRAYER, OF SOUTH BEND, INDIANA.

FERTILIZER-DISTRIBUTER.

SPECIFICATION forming part of Letters Patent No. 262,498, dated August 8, 1882.

Application filed March 21, 1882. (No model.)

*To all whom it may concern:*

Be it known that I, JACOB STRAYER, of South Bend, in the county of St. Joseph and State of Indiana, have invented certain new and useful Improvements in Fertilizer-Distributers; and I do hereby declare the following to be a full, clear, and exact description of the invention, such as will enable others skilled in the art to which it pertains to make and use the same.

My invention relates to fertilizer and seed distributers; and it consists in the peculiar construction of the same, as will be hereinafter fully set forth and claimed.

Figure 1:
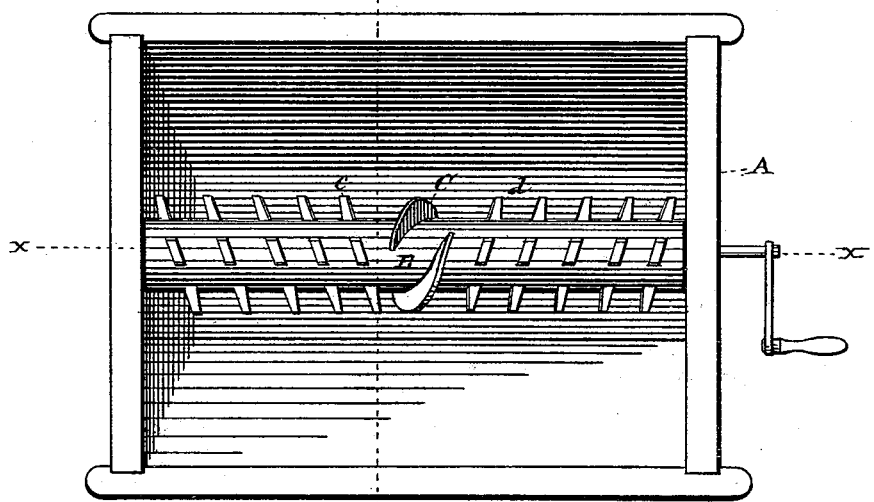
Figure 2:
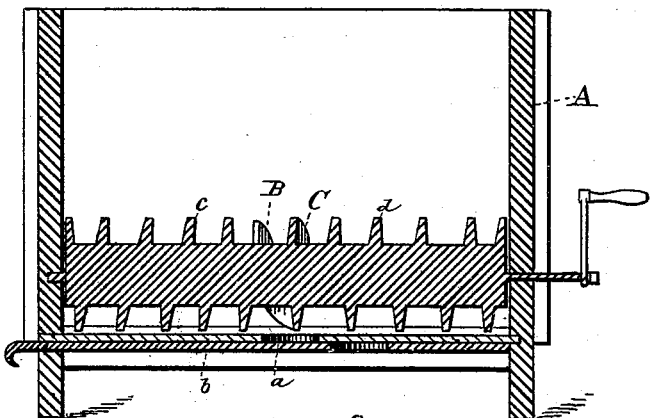
Figure 3:
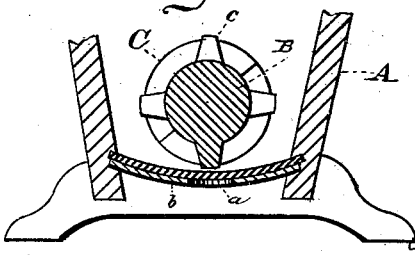

In the drawings, Figure 1 is a plan view of a hopper of a fertilizer-distributer containing my improvement. Fig. 2 is a longitudinal vertical section taken through the same on line $x$ $x$, Fig. 1; and Fig. 3 is a vertical cross-section taken on line $y$ $y$, Fig. 1.

A is a hopper, of any suitable construction, which is provided with perforations $a$ in its bottom. These perforations are opened or closed by means of a slide, $b$.

B is a distributer, which is made in the form of a cylinder, having teeth $c$ and $d$ set in the same. These teeth $c$ and $d$ are set in the cylinder B in such a manner as to form a right and left hand spiral, which acts upon the fertilizer or seed in such a manner as to draw the same toward an agitator, C, which is placed on the cylinder B in such a position as to be directly over the opening $a$, and thus act to agitate the fertilizer or seed and cause it to fall through the said opening.

In the drawings I have shown the mechanism for feeding to one opening only; but it is obvious that in a machine where eight or more holes are provided the cylinder B is made much longer and provided with a corresponding number of teeth and agitators, two series of teeth and one agitator being provided for each opening.

I am aware that it is not new to combine a spiral conveyer with a feed-hopper, as such a combination has heretofore been used in seeding-machines. I am also aware that it is not new to provide a feed shaft or roller with teeth arranged spirally upon the roller. Hence I make no claim to such features of construction, broadly considered; but in my distributer the feeding-teeth are arranged spirally on either side of a spiral agitator and at opposite inclinations, thus forming a right and left hand conveyer, which operates to feed the material to the discharge-opening. The teeth operate not only as conveyers, but also to crush and disintegrate the material, to prevent clogging, and to insure a free discharge.

What I claim is—

In a fertilizer-distributer, the combination, with a hopper provided with a suitable opening for the passage of the material, of a shaft or cylinder provided with a spiral agitator arranged above said opening, and with teeth arranged spirally on either side of the agitator and at opposite inclinations, to form a right and left hand spiral conveyer for the material, substantially as set forth.

In testimony whereof I have signed my name to this specification in the presence of two subscribing witnesses.

JACOB STRAYER.

Witnesses:
 LUCIUS HUBBARD,
 A. J. EGBERT.